United States Patent
Gemes et al.

(10) Patent No.: US 6,267,939 B1
(45) Date of Patent: Jul. 31, 2001

(54) ABSORBENT COMPOSITION FOR PURIFYING GASES WHICH CONTAIN ACIDIC COMPONENTS

(75) Inventors: Istvan Gemes, Petfurdo; Tamas Drozda, Veszprem; Gyorgy Borsi, Veszprem; Peter Aranyi, Veszprem; Miklos Nyari, Petfurdo; Katalin Novotnik, Varpalota; Arpad Vago, Kiskunhalas; Laszlo Beliczay, Budapest; Karoly Olah, Kiskunhalas; Gyorgy Csoor, Szolnok; Levente Kotsis, Balatonalmadi; Zoltan Nagy; Ervin Vertesi, both of Veszprem, all of (HU)

(73) Assignees: Huntsman Corporation Hungary Vegyipari Termelo-Fejleszto Reszvenytarsasag, Petfurdo; Mol Magyar Olaj-Es Gazipari Rt., Budapest; Alkoto-Pannon Muszaki Fejleszto es Szolgaltato KFT, Veszprem, all of (HU)

( * ) Notice: Subject to any disclaimer, the term of this patent is extended or adjusted under 35 U.S.C. 154(b) by 0 days.

(21) Appl. No.: 09/463,319
(22) PCT Filed: Jul. 20, 1998
(86) PCT No.: PCT/HU98/00064
§ 371 Date: Mar. 21, 2000
§ 102(e) Date: Mar. 21, 2000
(87) PCT Pub. No.: WO99/04885
PCT Pub. Date: Feb. 4, 1999

(30) Foreign Application Priority Data

Jul. 22, 1997 (HU) .................................................. 9701269

(51) Int. Cl.[7] .................................................. C01B 31/21
(52) U.S. Cl. ...................... 423/228; 423/242.7; 252/189; 252/190
(58) Field of Search .................................... 423/220, 226, 423/228, 242.7; 252/189, 190

(56) References Cited

U.S. PATENT DOCUMENTS

| 4,251,494 | 2/1981 | Say ........................................ 423/228 |
| 5,277,885 | * 1/1994 | Peytavy ............................... 423/228 |

FOREIGN PATENT DOCUMENTS

| 0 672 446 | 9/1995 | (EP) . |
| 2 018 615 | 10/1979 | (GB) . |
| 1378901 | * 3/1988 | (SU) . |
| WO 89/11327 | 11/1989 | (WO) . |

OTHER PUBLICATIONS

Dictionaty of Chemical Names and Synonyms, Howard et al. 1992.*

* cited by examiner

Primary Examiner—Steven P. Griffin
Assistant Examiner—Maribel Medina
(74) Attorney, Agent, or Firm—Young & Thompson

(57) ABSTRACT

An absorbent composition for purifying gases which contain acidic components. The composition contains at least one compound of formula (I), wherein n is 2–6, p is 1–3, the $R^1$ groups may be the same or different and represent hydrogen or $C_{1-3}$ alkyl, and $R^2$ is hydrogen, $C_{1-3}$ alkyl or a group of formula (II). The composition is an aqueous solution of 20–60 w/w %.

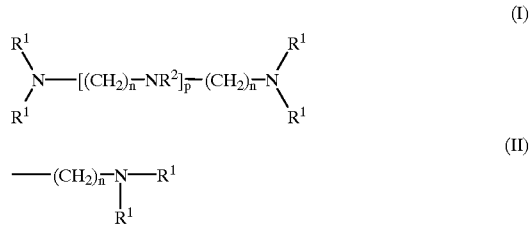

10 Claims, 2 Drawing Sheets

ABSORBENT COMPOSITION FOR PURIFYING GASES WHICH CONTAIN ACIDIC COMPONENTS

FIELD OF THE INVENTION

The invention relates to a new absorbent composition which can be used to purify gases which contain acidic components. The invention also relates to a method for purifying gases which contain acidic components making use the composition according to the invention.

The composition according to the invention fits for the purification of any gas which contains carbon dioxide and/or acidic sulfides (hydrogen sulfide, carbon oxysulfide, etc.) as components to be removed. Examples of such gases are natural gas, synthesis gas, various biogases and various environmentally detrimental industrial outgases. Removal of carbon dioxide from natural. Gas is the main field of use of the absorbent composition according to the invention, therefore in the following the composition and its use will be described in connection with the removal of carbon dioxide from natural gas.

BACKGROUND OF THE INVENTION

As known, natural gas is a mixture of gaseous hydrocarbons, primarily of methane, ethane, propane, and butane, which also contains minor amounts of heavier hydrocarbon components along with varying amounts of gaseous non-hydrocarbon components, such as nitrogen, carbon dioxide and hydrogen sulfide.

Natural gas emerged from several gas fields is "acidic", i.e. it contains considerable amounts of carbon dioxide and hydrogen sulfide. Of them carbon dioxide is a corrosive component which also impairs the caloric value of natural gas, whereas hydrogen sulfide, along with the other sulfides optionally present, produces corrosive and poisonous substances upon combustion. Removal of acidic components is the most frequent goal of natural gas purification, which is performed by using physical or chemical absorbents optionally in combination with one another.

Upon physical absorption carbon dioxide and hydrogen sulfide dissolve practically only physically in the solvent applied as absorbent. When absorption is over, pressure is decreased considerably whereupon gaseous components get desorbed in their original state. The solvent is then recycled. Organic solvents of high boiling points, such as polyethylene glycol dimethyl ether (Selexol) or tetrahydrothiophene-1,1-dioxide (Sulfolan) are used as physical adsorbents.

In chemical absorption methods aqueous solutions of various alkanolamine compounds, such as of monoethanol amine (MEA), diethanol amine (DEA). diisopropano amine (DIPA), diglycol amine ($HOCH_2CH_2OCH_2CH_2NH_2$, DGA) and methyl diethanol amine [$(HOCH_2CH_2)_2NCH_3$, MDEA] are utilized, which chemically, bind the acidic components to be removed in the form of adducts (Ullmann's Encyclopedia Vol. A12, pp. 258–259). Solvent regeneration is based on the phenomenon that an increase in temperature and a decrease in pressure runs with the decomposition of the complex, whereupon the acidic gas liberates.

The advantages of chemical absorption (recovery of COS, low level of methane co-absorption) can be increased with the simultaneous use of physical absorbents.

Of the monoamines utilized as chemical absorbents primary amines (monoethanol amine and diglycol amine) are the most reactive ones, therefore these substances (particularly monoethanol amine which is much more easily available than the other one) have been utilized for several years almost exclusively to remove hydrogen sulfide and carbon dioxide from natural gas and from certain synthesis gases. Although these substances yield gases of high final purity, it is disadvantageous that they produce corrosive products with carbon oxysulfide and carbon disulfide, and corrosion also appears after the uptake of a certain amount of carbon dioxide. In order to eliminate this problem various corrosion inhibitors are added to the absorbent solution. Examples of such methods are the UCAR process and the "Amine Guard" process [1989 Gas Process Handbook (Hydrocarbon Process, Gulf Publishing Co., Houston, 1989)], both developed by Union Carbide, of which the second one can be applied to remove carbon dioxide only, because the sulfur-containing components react with the inhibitors utilized. However, the second serious disadvantage connected to the use of primary amine solutions, i.e. that they recovery runs with a great energy consumption due to the high absorption-resorption reaction heat, cannot be eliminated by these methods.

Due to the disadvantages outlined above primary monoamines have been gradually replaced by secondary and tertiary monoamines. Of theni secondary monoamines. such as diethanol amine and diisopropanol amine, are less reactive than the primary amines, but their reactions do not lead to corrosion, and the energy demand of the recovery of secondary amine solutions is less by 20–30% than that of primary amine solutions. However, the usability of secondary amines is more restricted than that of primary amines, because secondary amines react with carbon dioxide (which is the most frequent component to be removed) less quickly than with hydrogen sulfide. Methyl diethanol amine (a tertiary amine) has more advantageous selectivity characteristics than secondary amines, its corrosivity is very low (in carbon steel equipment even a load of 0.8 mole of acidic gas/1 mole of MDEA is admissible), and the recovery of its aqueous solution is less energy-intensive than that of secondary amine solutions. Therefore recently this compound is utilized most frequently to purify acidic gases by chemical run with considerable losses in amine. As a further disadvantage, their recovery is rather energy-intensive, and energy can be saved only on the account of a decrease in reactivity.

It appears from the test data reported in international patent application published under No. WO 89/11327 that certain amino compounds, including polyamines of the formula

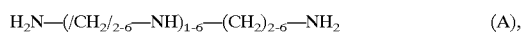

$$H_2N-(/CH_2/_{2\text{-}6}-NH)_{1\text{-}6}-(CH_2)_{2\text{-}6}-NH_2 \qquad (A),$$

can be used as activators to accelerate the reaction rate of tertiary alkanolamines. However, the energy demand of recovery remains still relatively high, and recovery of the ternary alkanolamine/activator/water mixture is rather complicated. DE 2815447 reports that some representatives of the above compounds have excellent $CO_2$ binding ability. No information can be derived, however, from this reference on the reaction rate and on the energy demand of recovery.

There is still a need for improving the economy of purification of gases containing acidic components. More particularly, an absorbent composition is required which has a high reaction rate and can be recovered by an easy and non energy-intensive way with minimum losses.

As a result of our investigations we have found that aqueous solutions of polyalkylene polyamines of the general formula

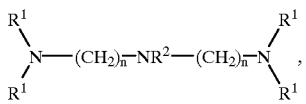

(I)

wherein n is 2 or 3, the $R^1$ groups represent methyl or one of them is hydrogen and the others are methyl, and $R^2$ is hydrogen, methyl or a group of the formula —$(CH_2)_{2-3}$—$N(CH_3)_2$, can be utilized very advantageously for the purification of gases containing acidic components, primarily for rendering natural gas free of carbon dioxide.

We have not found any reference to this use of polyalkylene polyamines of formula (I) in the literature. Soviet Patent No. 1 378 901 states that when natural gas is desulfurized with sodium hydroxide, the efficiency of purification can be increased and the corrosion of the equipment can be suppressed if the aqueous sodium hydroxide solution is admixed in a volume ratio of 1:(1–3) with a waste liquor obtained in alkaline desulfurization of liquefied gases, and a polyalkylene polyamine is added to the mixture in an amount of 0.5–2.5% by volume. Thus this paper relates essentially to the reuse of waste liquors. Compounds of formula (I) have been utilized in this process as corrosion inhibitors without even mentioning their possible absorbent effect.

SUMMARY OF THE INVENTION

Thus, the invention relates to an absorbent composition for the purification of gases containing acidic components, primarily for removing carbon dioxide from natural gas. The composition according to the invention comprises one or more polyamine(s) of formula (I) as an aqueous solution of 20–60% by weight, preferably of 30–50% by weight.

Preferred representatives of the compounds of formula (I) are those mentioned in the Examples. Bis(3-dimethylamino-propyl)-amine, furthermore mixtures of bis(3-dimethylamino-propyl)-amine and N-(3-dimethylamino-propyl)-N-(3-mono-methylamino-propyl)-amine proved to be especially preferred.

The absorbent compositions according to the invention may optionally also contain one or more activator(s) in an amount of 0.01–0.5% by weight, preferably 0.02–0.2% by weight, related to the weight of the compound of formula (I). Alkali metal compounds which provide alkaline hydrolysis products, such as alkali metal hydroxides and hydrocarbonates, furthermore aliphatic and cycloaliphatic mono- and diamines, such as triethylene diamine, dicyclohexyl amine, N-ethyl-cyclohexyl amine and N,N-dimethyl-cyclohexyl amine, can be applied as activators. These activators accelerate the sorption processes. Sodium hydrocarbonate and triethylene diamine can be used as activators with particularly good results.

If desired, the absorbent compositions according to the invention may also contain various additives routinely applied in such compositions, such as antifoam agents, physical absorbents, chemical co-absorbents (among them alkyl and alkanol monoamines utilized before as chemical absorbents), colouring agents, and the like, however, the use of such components may also be omitted.

In a further aspect, the invention relates to a method for purifying a gas which contains acidic components, particularly for removing carbon dioxide from natural gas, by scrubbing with an aqueous solution of an amine compound. According to the invention a composition as defined above is used as scrubbing solution.

In other respects, purification of gases containing acidic components is performed under the usual operative conditions of such methods. Taking into account, however, that at low pressures (i.e. at pressures below about 0.5–1 bar) the carbon dioxide binding ability of the compounds of formula (I) is very much higher than that of methyl-diethanol amine, the most widespread one of the recently applied scrubbing agents, the method according to the invention can also be performed at lower pressures than used before.

The most important advantages provided by the compositions according to the invention are as follows:

they bind carbon dioxide very quickly, under low pressures their carbon dioxide binding ability is much greater than that of methyl-diethanol amine, polyalkylene polyamines of formula (I) are less volatile, thus only minor losses in amine occur at the recovery of the scrubbing solution, which is advantageous both economically and from the aspects of environmental protection, the toxicity of the compounds of formula (I) is very low, which involves a further advantage from the aspects of environmental protection, the energy demand of recovery is low.

BRIEF DESCRIPTION OF THE DRAWINGS

This invention may be clearly understood by reference to the attached drawings in which.

DETAILED DESCRIPTION OF THE PREFERRED EMBODIMENTS

Figure 1:
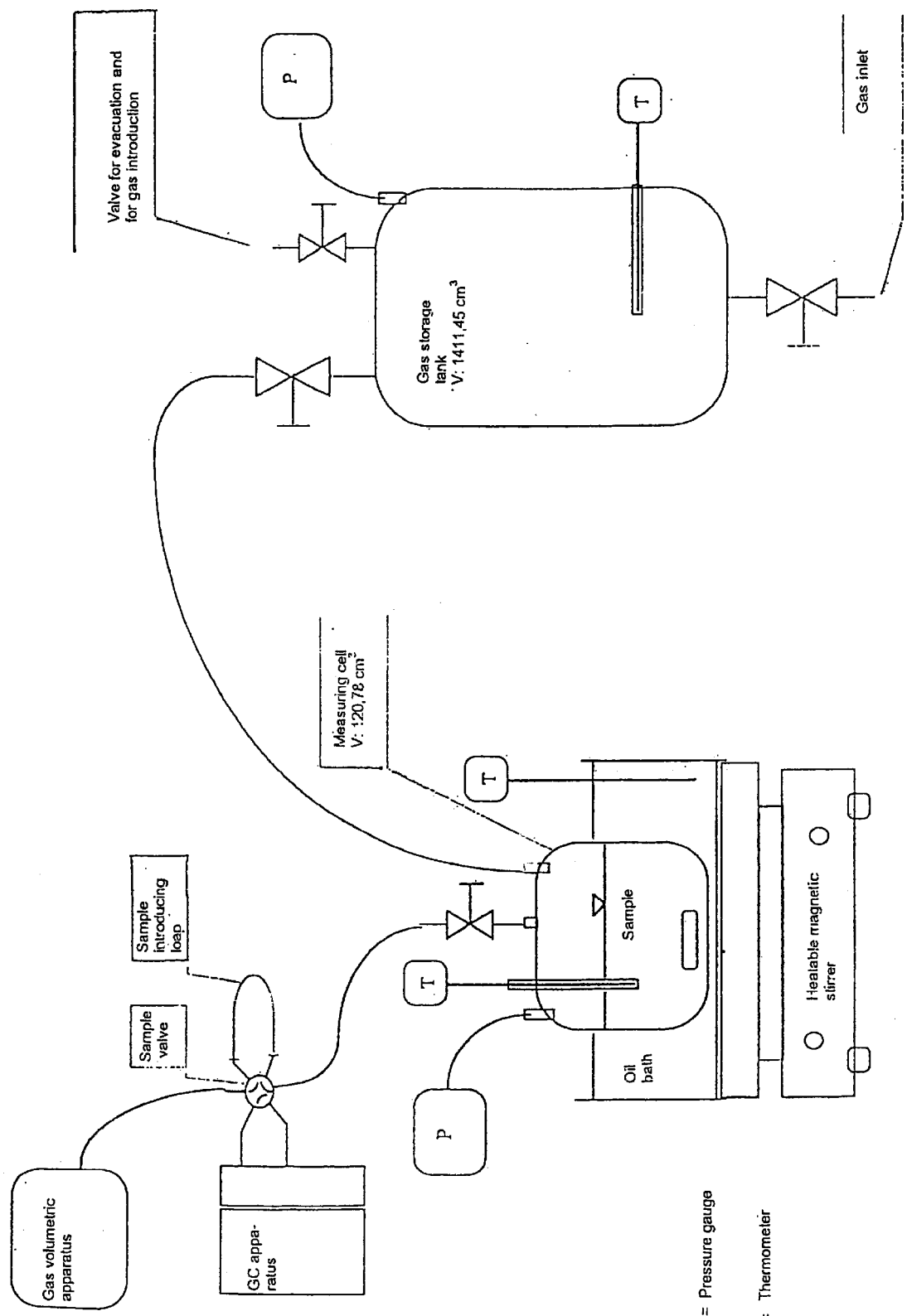
FIG. 1 shows a gas purification system.
Figure 2:
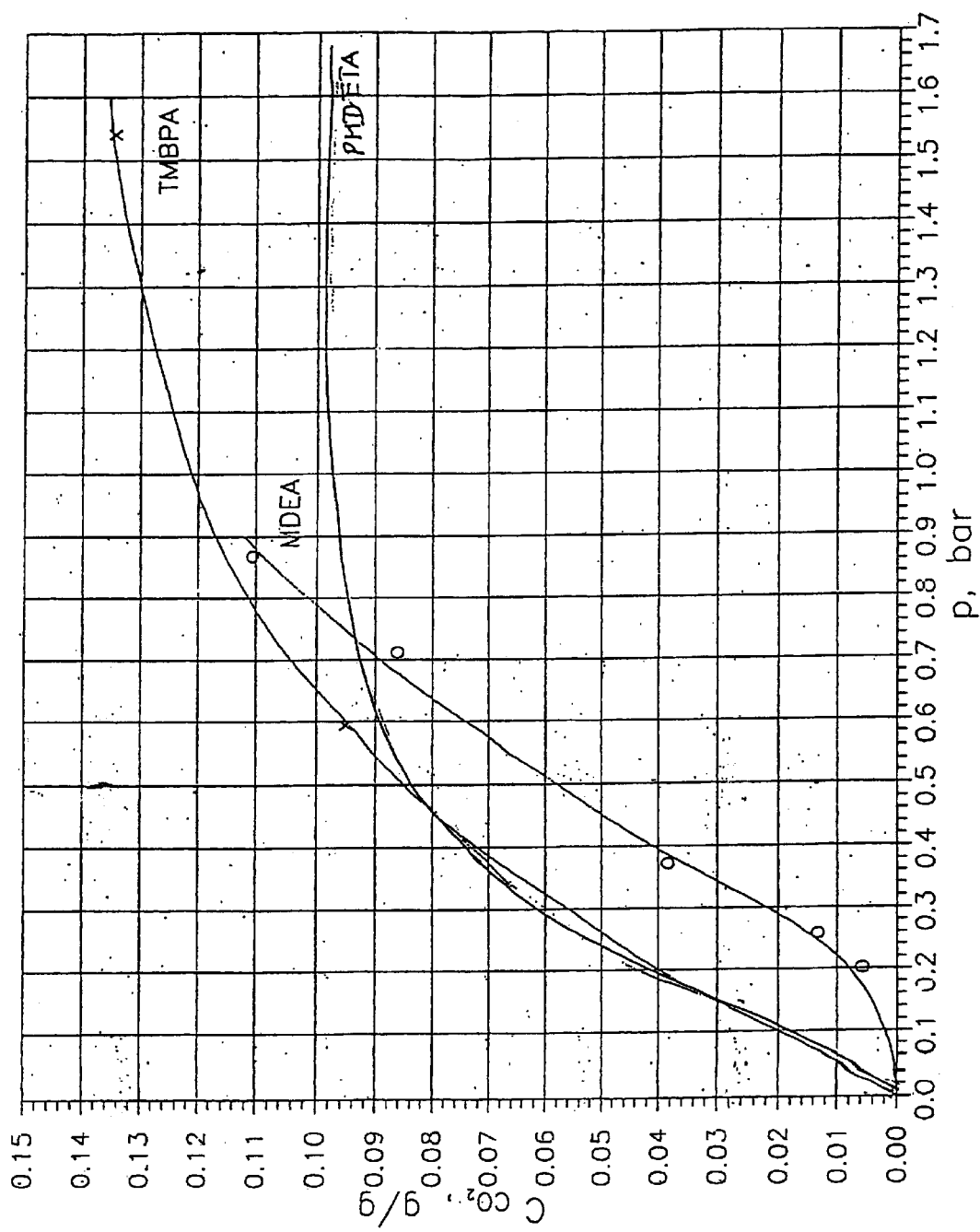
FIG. 2 shows an isotherm curve.

Further details of the invention appear from the following non-limiting Examples. The absorption equilibrium isotherms referred to in the Examples were taken with the equipment as shown in FIG. 1. The isotherm curves obtained are shown in FIG. 2.

EXAMPLE 1

To take the absorption equilibrium isotherm, 51.033 g of a 30.92% by weight aqueous solution of bis(3-dimethylamino-propyl)-amine [a 1:2 v/v mixture of bis(3-dimethylamino-propyl)-amine and distilled water] and 0.06 g of sodium hydrocarbonate activator were weighed into the measuring cell of the equipment shown in FIG. 1, equipped with a thermometer (T) and a pressure gauge (P). The measuring cell was evacuated to remove carbon dioxide. Thereafter 0.1123 mol of carbon dioxide was fed into the measuring cell from the gas storage tank. When equilibrium had been reached, which was demonstrated by the stabilization of temperature and pressure, sample was taken from the gas phase, and the carbon dioxide content of the sample was determined by gas chromatography. The gas phase contained 0.001689 mole of carbon dioxide, thus 0.11061 mole (4.8669 g) of carbon dioxide had been absorbed in the liquid. The carbon dioxide content of the liquid was 0.0953 g/g at an equilibrium pressure of 0.5996 bar. Thereafter further metered amounts of gas were introduced, and, when the individual equilibria had been reached, the above measurement was repeated. The absorption equilibrium isotherm constructed on the basis of these measurements is shown in FIG. 2 (curve denoted with TMBPA).

EXAMPLE 2

To take the absorption equilibrium isotherm, 50.32 g of a 35.45% by weight aqueous solution of pentamethyl-diethylene-triamine (a 1:2 v/v mixture of pentamethyl-diethylene-triamine and distilled water) and 0.06 g of sodium hydrocarbonate activator were weighed into the measuring cell of the equipment shown in FIG. 1, equipped with a thermometer (T) and a pressure gauge (P). The measuring cell was evacuated to remove carbon dioxide. Thereafter 0.02689 mol of carbon dioxide was fed into the measuring cell from the gas storage tank. When equilibrium had been reached, which was demonstrated by the stabilization of temperature and pressure, sample was taken from the gas phase, and the carbon dioxide content of the sample was determined by gas chromatography. The gas phase contained 0.000439 mole of carbon dioxide, thus 0.02645 mole (1.1638 g) of carbon dioxide had been absorbed in the liquid. The carbon dioxide content of the liquid was 0.0231 g/g at an equilibrium pressure of 0.1553 bar. Thereafter further metered amounts of gas were introduced, and, when the individual equilibria had been reached, the above measurement was repeated. The absorption equilibrium isotherm constructed on the basis of these measurements is shown in FIG. 2 (curve denoted with PMDETA).

EXAMPLE 3

This example serves for comparison purposes.

To take the absorption equilibrium isotherm, 50.462 g of a 52.38% by weight aqueous solution of methyl-diethanol-amine (a 1:1 v/v mixture of methyl-diethanol-amine and distilled water which also contained a minor amount of piperazine) and 0.06 g of sodium hydrocarbonate activator were weighed into the measuring cell of the equipment shown in FIG. 1, equipped with a thermometer (T) and a pressure gauge (P). The measuring cell was evacuated to remove carbon dioxide. Thereafter 0.0877 mol of carbon dioxide was fed into the measuring cell from the gas storage tank. When equilibrium had been reached, which was demonstrated by the stabilization of temperature and pressure, sample was taken from the gas phase, and the carbon dioxide content of the sample was measured by gas chromatography. The gas phase contained 0.000594 mole of carbon dioxide, thus 0.00818 mole (0.3597 g) of carbon dioxide had been absorbed in the liquid. The carbon dioxide content of the liquid was 0.00712 g/g at an equilibrium pressure of 0.2061 bar. Thereafter further metered amounts of gas were introduced, and, when the individual equilibria had been reached, the above measurement was repeated. The absorption equilibrium isotherm constructed on the basis of these measurements is shown in FIG. 2 (curve denoted with MDEA).

It appears from FIG. 2 that the solution with the composition as given in Example 1 bound much more carbon dioxide over the whole examined pressure range and the solution with the composition as given in Example 2 bound much more carbon dioxide in the low pressure range than the known comparative solution, despite of the fact that their amine compound contents were only about two-third of that of the comparative solution.

EXAMPLE 4

To measure the speed of carbon dioxide binding, the absorbent composition under test was flash contacted with carbon dioxide in a glass equipment under stirring, and the pressure of the dissolved gas was measured continuously with a strain gauge membrane manometer giving electric signals. From the measured values the speed of carbon dioxide binding (k, litre/minute) was calculated.

Solutions with the following compositions were tested:

A1: 100 cm$^3$ of a 30.92 w/w % aqueous bis(3-dimethylamino-propyl)-amine solution plus 0.12 g of sodium hydrocarbonate activator A2: 100 cm$^3$ of a 30.92 w/w % aqueous bis(3-dimethylamino-propyl)-amine solution plus 0.14 g of triethylene-diamine activator A3: 100 cm$^3$ of a 30.92 w/w % aqueous bis(3-dimethylamino-propyl)-amine solution plus 0.06 g of N-ethyl-yclohexylamine activator A4: 100 cm$^3$ of a 30.92 w/w % aqueous bis(3-dimethylamino-propyl)-amine solution plus 0.06 g of N,N-dimethyl-cyclohexylamine activator A5: 100 cm$^3$ of a 30.92 w/w % aqueous bis(3-dimethylamino-propyl)-amine solution plus 0.06 g of dicyclohexyl amine activator B: 100 cm$^3$ of a 52.38 w/w % aqueous methyl-diethanol amine solution which also contains a small amount of piperazine plus 0.12 g of sodium hydrocarbonate activator (comparative test).

The obtained results are listed in Table 1.

TABLE 1

| Solution | Rate constant (k, litre/minute) |
| --- | --- |
| A1 | 0.05903 |
| A2 | 0.0545 |
| A3 | 0.0489 |
| A4 | 0.0396 |
| A5 | 0.04167 |
| B | 0.0194 |

The results indicated in Table 1 show that the compositions according to the invention absorb carbon dioxide much more quickly than the known comparative composition, despite of the fact that their amine content is only about 60% of that of the known comparative composition.

What we claim is:

1. An absorbent composition for purifying a gas which contains an acidic component, the composition comprising:
   at least one compound of formula (I)

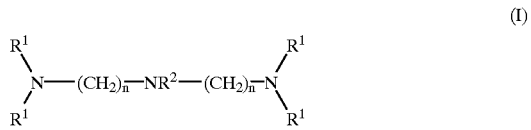

(I)

wherein n is 2 or 3,
   the $R^1$ groups represent methyl or one of them is hydrogen and the others are methyl, and
   $R^2$ is hydrogen, methyl or a group of the formula —$(CH_2)_{2\text{-}3}$—$N(CH_3)_2$ as an aqueous solution of 20–60 w/w %.

2. The composition as claimed in claim 1, wherein said at least one compound of formula (I) is present as an aqueous solution of 30–50 w/w %.

3. The composition as claimed in claim 1, wherein said at least one compound of formula (I) comprises bis(3-dimethylamino-propyl)-amine, and optionally, N-(3-dimethylamino-propyl)-N-(3-monomethylamino-propyl)-amine.

4. The composition as claimed in claim 1, further comprising one or more activators in an amount of 0.01–0.5% by weight of said compound of formula (I).

5. The composition as claimed in claim 4, wherein said activator is present in an amount of 0.02–0.2% by weight of said compound of formula (I).

6. The composition as claimed in claim 4, wherein said activator is selected from the group consisting of sodium hydroxide, sodium hydrocarbonate, triethylene diamine, di-cyclohexyl amine, N-ethyl-cyclohexyl amine and N,N-dimethyl-cyclohexyl amine.

7. The composition as claimed in claim 6, wherein said activator is sodium hydrocarbonate or triethylene diamine.

8. A process for purifying a gas which contains an acidic component, the process comprising:

scrubbing the gas with a composition as claimed in claim 1.

9. The process for purifying a gas as claimed in claim 8, wherein said scrubbing step further comprises:

selecting natural gas as the gas for purifying, said purifying of the natural gas removes carbon dioxide.

10. The process for purifying a gas as claimed in claim 9, wherein said scrubbing step further comprises:

selecting bis(3-dimethylamino-propyl)-amine in the compound of formula (I).

\* \* \* \* \*